(12) United States Patent
Kamiya (10) Patent No.: US 7,433,409 B2
(45) Date of Patent: Oct. 7, 2008

(54) APPARATUS AND METHOD OF MULTIPLE DECODING

(75) Inventor: Akira Kamiya, Nagaokakyo (JP)

(73) Assignee: Matsushita Electric Industrial Co., Ltd., Osaka-Fu (JP)

(*) Notice: Subject to any disclaimer, the term of this patent is extended or adjusted under 35 U.S.C. 154(b) by 914 days.

(21) Appl. No.: 09/900,168

(22) Filed: Jul. 9, 2001

(65) Prior Publication Data

US 2002/0003845 A1    Jan. 10, 2002

(30) Foreign Application Priority Data

Jul. 10, 2000    (JP) ............................. 2000-208074

(51) Int. Cl.
    *H04N 7/18* (2006.01)
(52) U.S. Cl. ............................. 375/240.25; 375/240.26
(58) Field of Classification Search ......... 348/714–716, 348/718; 375/240.01–240.29; 386/111, 386/125; 725/86; *H04N 7/12*
    See application file for complete search history.

(56) References Cited

U.S. PATENT DOCUMENTS

| 5,159,447 | A | * | 10/1992 | Haskell et al. | ......... | 375/240.05 |
| 5,343,250 | A | | 8/1994 | Iwamura | | |
| 5,646,687 | A | * | 7/1997 | Botsford et al. | ........ | 375/240.12 |
| 5,721,590 | A | | 2/1998 | Sanpei | | |
| 6,026,088 | A | | 2/2000 | Rostoker et al. | | |
| 6,028,632 | A | * | 2/2000 | Siong et al. | ............. | 375/240.01 |
| 6,061,402 | A | | 5/2000 | Boyce et al. | | |
| 6,064,795 | A | * | 5/2000 | Uchide | ................... | 375/240.01 |
| 6,263,023 | B1 | * | 7/2001 | Ngai | ..................... | 375/240.12 |
| 6,332,058 | B1 | * | 12/2001 | Kawakami | ................... | 386/111 |
| 6,408,436 | B1 | * | 6/2002 | de Haas | ........................ | 725/86 |
| 6,614,990 | B1 | * | 9/2003 | Nishida et al. | ............... | 386/125 |

FOREIGN PATENT DOCUMENTS

| EP | 0 817 492 | 1/1998 |
| EP | 0 817 501 | 1/1998 |
| JP | 5-292490 | 11/1993 |
| JP | 7-135659 | 5/1995 |
| JP | 10-304311 | 11/1998 |
| JP | 11-018078 | 1/1999 |

OTHER PUBLICATIONS

Sarginson, P.A.: "MPEG-2: A Tutorial Introduction To The Systems Layer", IEE Colloquium On 'MPEG-2—What It Is and What It Isn't' (Digest No. 1995/012) IEE London, UK, 1995, pp. 4/1-13, XP006529329.

* cited by examiner

*Primary Examiner*—Andy S Rao
(74) *Attorney, Agent, or Firm*—Wenderoth, Lind & Ponack, L.L.P.

(57) ABSTRACT

A data extractor 110 extracts data which coincides with set conditions from input data. A buffer 120 stores the extracted data. A data flow controller 130 distributes the data in the buffer 120 among separate buffers 14*i* (i=1 to n) and transfers the data in accordance with the set conditions. Each of the separate buffers 14*i* stores the transferred data. Decoders 15*i* respectively decode the data stored in the separate buffers 14*i*. A buffer manager 160 manages the buffer 120, and a separate buffer manager 170 manages the separate buffers 14*i*. A decoding controller 180 controls decoding performed by each of the decoders 15*i*. A reproduction controller 190 provides an instruction required to select desired data and reproduce the selected data. Consequently, decoding and reproduction of a plurality of data in digital broadcasting are realized, thereby making it possible to recover, when an error occurs, from the error.

4 Claims, 8 Drawing Sheets

APPARATUS AND METHOD OF MULTIPLE DECODING

BACKGROUND OF THE INVENTION

1. Field of the Invention

The present invention relates generally to an apparatus and a method of multiple decoding, and more specifically, to apparatuses and methods of reproducing a plurality of data designated from one MPEG (Moving Picture Experts Group) transport stream composed of a plurality of encoded data.

2. Description of the Background Art

In recent years, satellite television broadcasting, cable television broadcasting and ground wave television broadcasting have been digitized, so that a broadcasting station can transmit a plurality of video and audio data. In a receiver, it is possible to receive the plurality of video and audio data, and selectively display by video and output by audio any of the data. That is, a user can select and view any one of a plurality of video and audio transmitted by the broadcasting station.

Figure 8:
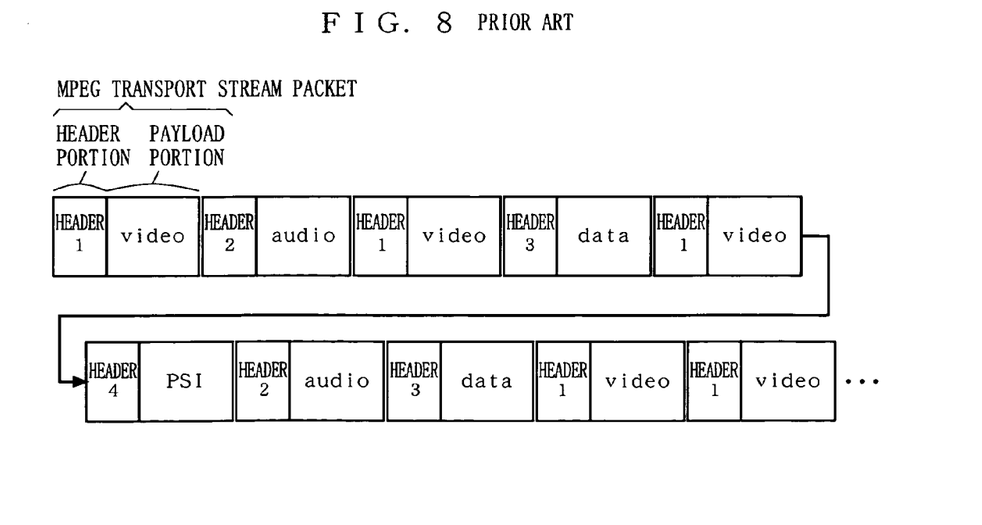
FIG. 8 is a diagram for explaining an MPEG transport stream.
Figure 9:
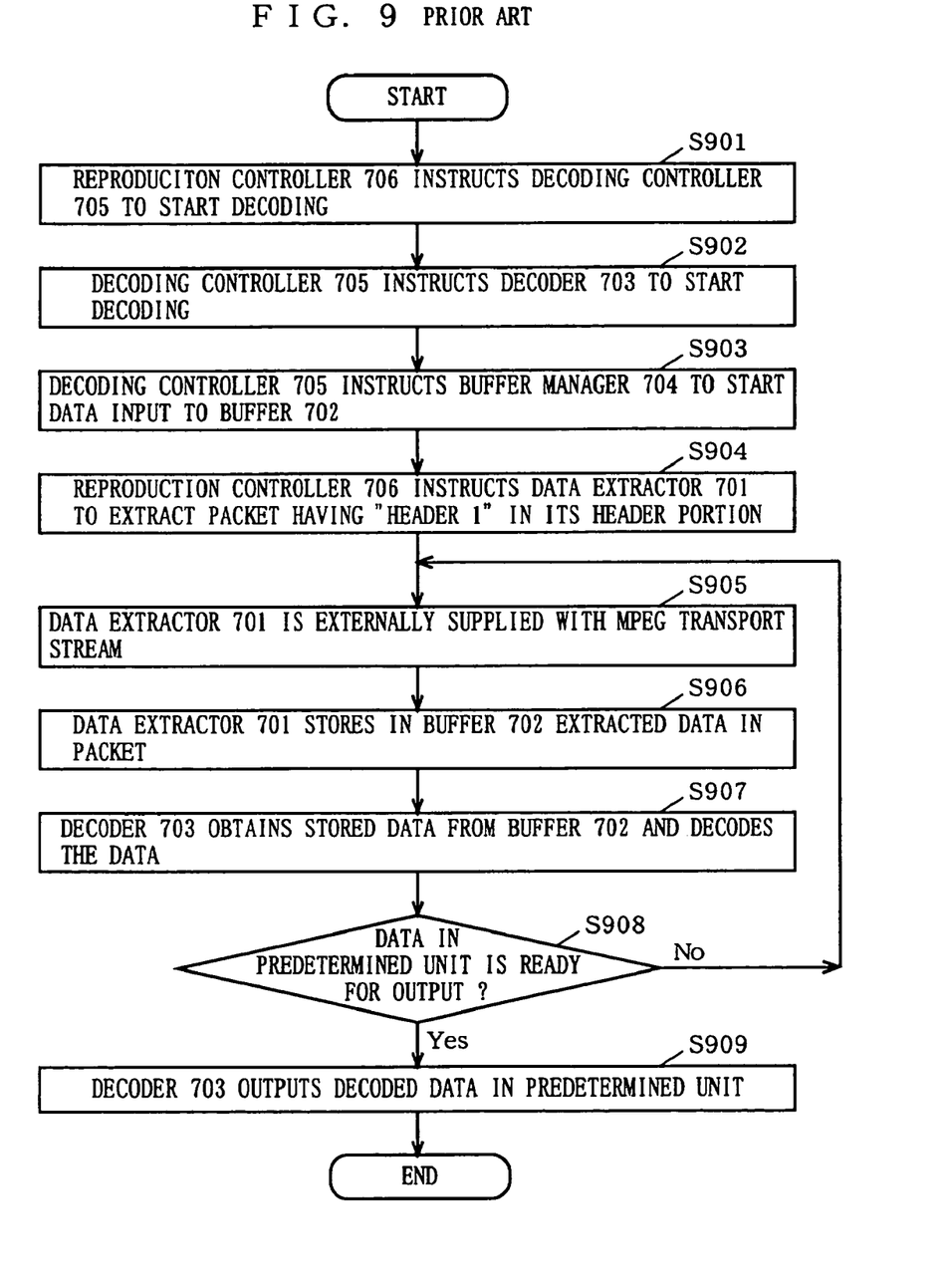
FIG. 9 is a flow chart showing the procedure for processing performed by the conventional decoding apparatus.

A conventional decoder used in such a receiver will be described with reference to FIGS. 7 to 9.

Figure 7:
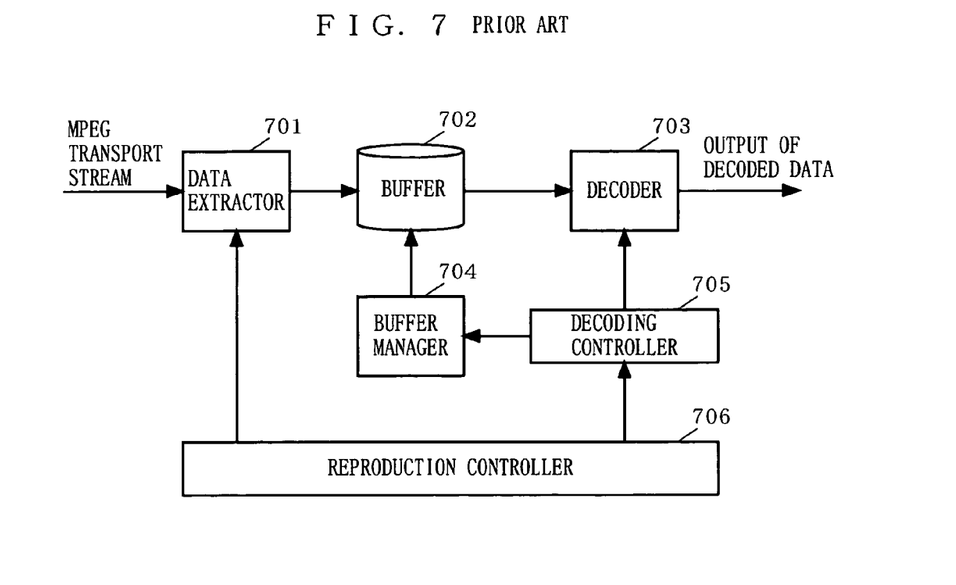
FIG. 7 is a block diagram showing the configuration of a conventional decoding apparatus.

FIG. 7 is a block diagram showing the configuration of a conventional decoding apparatus. FIG. 8 is a diagram showing a specific example in which data representing video and audio and other data are multiplexed on an MPEG transport stream. FIG. 9 is a flow chart for explaining processing performed by the conventional decoding apparatus.

As is well known, the MPEG transport stream is a stream data string in a data format defined in the ISO/IEC13818-1 standard for data transmission and receiving, and is composed of units called packets. On the side of a transmitter, data representing a plurality of video and audio and other data are respectively stored in payload portions of the packets, and the packets are then multiplexed, to compose an MPEG transport stream (FIG. 8) for transmission toward a receiver. On the other hand, on the side of the receiver, it is possible to judge a header portion of each of the packets composing the MPEG transport stream, to selectively obtain the data representing video and audio and other data.

The conventional decoding apparatus receives the MPEG transport stream including encoded data representing a plurality of video and audio. A method of selecting the inputted MPEG transport stream is not required in describing the background art. Further, modulation and demodulation control is performed depending on a satellite, a cable, and a ground wave and hence, the description thereof is omitted herein. Consequently, the following description will be made using as a premise a state where the corresponding MPEG transport stream has already been selected.

In FIG. 7, the conventional decoding apparatus comprises a data extractor 701, a buffer 702, a decoder 703, a buffer manager 704, a decoding controller 705, and a reproduction controller 706.

First, the reproduction controller 706 instructs the decoding controller 705 to start decoding (step S901). The decoding controller 705 which has received the instruction instructs the decoder 703 to start decoding (step S902), and instructs the buffer manager 704 to start data input to the buffer 702 (step S903). The reproduction controller 706 then instructs the data extractor 701 to extract a packet having desired header information from the inputted MPEG transport stream (FIG. 8), the packet having "Header 1" in its header portion in this example (step S904).

When the extraction instruction is issued to the data extractor 701, the input of the MPEG transport stream externally supplied to the data extractor 701 is started (step S905). The data extractor 701 sequentially extracts the packets each having "Header 1" designated from the MPEG transport stream, and stores in the buffer 702 the data stored in the payload portions of the extracted packets (step S906). The decoder 703 obtains the data stored in the buffer 702, and sequentially performs the decoding (step S907). The decoder 703 confirms whether or not the decoded data, corresponding to a predetermined unit to be outputted, is ready for output (step S908). The predetermined unit to be outputted is a frame in the case of video data, for example. In the confirmation in the step S908, when the decoded data, corresponding to the predetermined unit, are not ready for output yet, the decoder 703 continues the decoding of the subsequent data (steps S905 to S907) to wait for data. When the decoded data, corresponding to the predetermined unit, are ready for output, the decoder 703 outputs the decoded data in the predetermined unit (step S909).

In the above-mentioned decoding apparatus, however, only one of the encoded data representing video and audio existing in the one MPEG transport stream can be decoded and reproduced.

Also, in the conventional decoding apparatus, there exists no method of sufficiently correcting any error which has occurred at the time of broadcasting from a broadcasting station or in a transmission path.

SUMMARY OF THE INVENTION

Therefore, an object of the present invention is to provide an apparatus and a method of multiple decoding, which makes it possible to simultaneously decode a plurality of encoded data, and to recover the decoding when an error occurred in certain decoding.

The present invention has the following features to solve the problem above.

A first aspect of the present invention is directed to a multiple decoding apparatus receiving a signal composed of a plurality of encoded data for simultaneously decoding two or more of the data, and the multiple decoding apparatus includes:

a reproduction controller for outputting various types of control information related to decoding and reproduction of the data;

a data extractor receiving the signal for extracting the two or more data designated by the control information;

a buffer storing the data extracted by the data extractor;

a buffer manager for controlling the buffer in accordance with the control information for the buffer;

a data flow controller for distributing the data stored in the buffer for each type and transferring the data in accordance with provided transfer conditions;

a plurality of separate buffers for respectively storing the data distributed and transferred by the data flow controller;

a separate buffer manager for respectively controlling the separate buffers in accordance with information related to the specification of the separate buffer;

a plurality of decoders respectively corresponding to the plurality of separate buffers for decoding the data stored in the separate buffers and outputting the decoded data; and a decoding controller for selecting the separate buffer and the decoder which are used for the decoding in accordance with the control information, and outputting information related to the selected separate buffer, the transfer conditions based on the selected separate buffer, and an instruction to start the decoding, respectively, to the separate buffer manager, the data flow controller, and the selected decoder.

According to the first aspect, even when a single signal composed of a plurality of encoded data, for example, one MPEG transport stream is inputted, desired ones of the plurality of data can be simultaneously decoded.

Preferably, the buffer manager outputs, when the buffer becomes full of the data, an overflow notification to the reproduction controller, the reproduction controller outputs, upon receipt of the overflow notification, an instruction to stop the data extraction to the data extractor, and outputs an initialization instruction to the decoding controller;

the decoding controller outputs, upon receipt of the initialization instruction from the reproduction controller, an instruction to initialize all the plurality of separate buffers to the separate buffer manager, outputs to the buffer manager an instruction to initialize the buffer, and respectively outputs instructions to stop the decoding to all the plurality of decoders, the buffer manager initializes the buffer in accordance with the initialization instruction from the decoding controller, the separate buffer manager initializes all the plurality of separate buffers in accordance with the initialization instruction from the decoding controller, and all the processing which is stopped is resumed after all the buffer and the plurality of separate buffers are initialized.

Even when the buffer overflows due to the occurrence of any error, therefore, it is feasible to recover unsuccessful decoding due to the error.

More preferably, the separate buffer manager outputs, when the specific separate buffer becomes full of the data, an overflow notification that the specific separate buffer overflows to the decoding controller, the decoding controller outputs, upon receipt of the overflow notification that the specific separate buffer overflows, an instruction to stop the data transfer to the specific separate buffer to the data flow controller, outputs an instruction to stop the decoding to the decoder corresponding to the specific separate buffer, and outputs to the separate buffer manager an instruction to initialize the specific separate buffer, the separate buffer manager initializes the specific separate buffer in accordance with the initialization instruction from the decoding controller, and all the processing which is stopped is resumed after the specific separate buffer is initialized.

Furthermore, preferably, the separate buffer manager outputs, when the specific separate buffer becomes full of the data, an overflow notification that the specific separate buffer overflows to the decoding controller, the decoding controller outputs, upon receipt of the overflow notification that the specific separate buffer overflows, an instruction to discard the data directed toward the specific separate buffer to the data flow controller, outputs an instruction to stop the decoding to the decoder corresponding to the specific separate buffer, and outputs to the separate buffer manager an instruction to initialize the specific separate buffer, the separate buffer manager initializes the specific separate buffer in accordance with the initialization instruction from the decoding controller, and all the processing which is stopped is resumed, and the discard of the data is released after the specific separate buffer is initialized.

Even when one or two or more separate buffers overflow due to the occurrence of any error, therefore, it is feasible to recover the decoding in which a problem occurs due to the occurrence of an error.

A second aspect of the present invention is directed to a multiple decoding method, in which a signal composed of a plurality of encoded data is inputted, to simultaneously decode two or more of the data, comprising the steps of:

inputting the signal and extracting the two or more data to be decoded and reproduced;

storing the extracted data in a buffer;

distributing the data stored in the buffer for each type and respectively storing the data in the plurality of separate buffers; and respectively decoding the data stored in the plurality of separate buffers and outputting the decoded data.

According to the second aspect, even when a single signal composed of the plurality of encoded data is inputted, desired ones of the plurality of data can be simultaneously decoded.

Preferably, the method further includes, when the buffer becomes full of the data, the steps of stopping extraction and decoding of the data, initializing all the buffer and the plurality of separate buffers, and resuming all the processing which is stopped after all the buffer and the plurality of separate buffers are initialized.

Even when the buffer overflows due to the occurrence of any error, therefore, it is feasible to recover unsuccessful decoding due to the error.

More preferably, the method further includes, when the specific separate buffer becomes full of the data, the steps of stopping the distribution of the data into the specific separate buffer and the decoding of the data stored in the specific separate buffer, initializing the specific separate buffer; and resuming all the processing which is stopped after the specific separate buffer is initialized.

Furthermore, preferably, the method further includes, when the specific separate buffer becomes full of the data, the steps of discarding the data directed toward the specific separate buffer, stopping the decoding of the data stored in the specific separate buffer, initializing the specific separate buffer, and resuming all the processing which is stopped after the specific separate buffer is initialized, and releasing the discard of the data.

Even when one or two or more separate buffers overflow due to the occurrence of any error, therefore, it is feasible to recover unsuccessful decoding due to the error.

These and other objects, features, aspects and advantages of the present invention will become more apparent from the following detailed description of the present invention when taken in conjunction with the accompanying drawings.

DESCRIPTION OF THE PREFERRED EMBODIMENT

Referring now to the drawings, description is made of a multiple decoding apparatus provided by the present invention.

Figure 1:
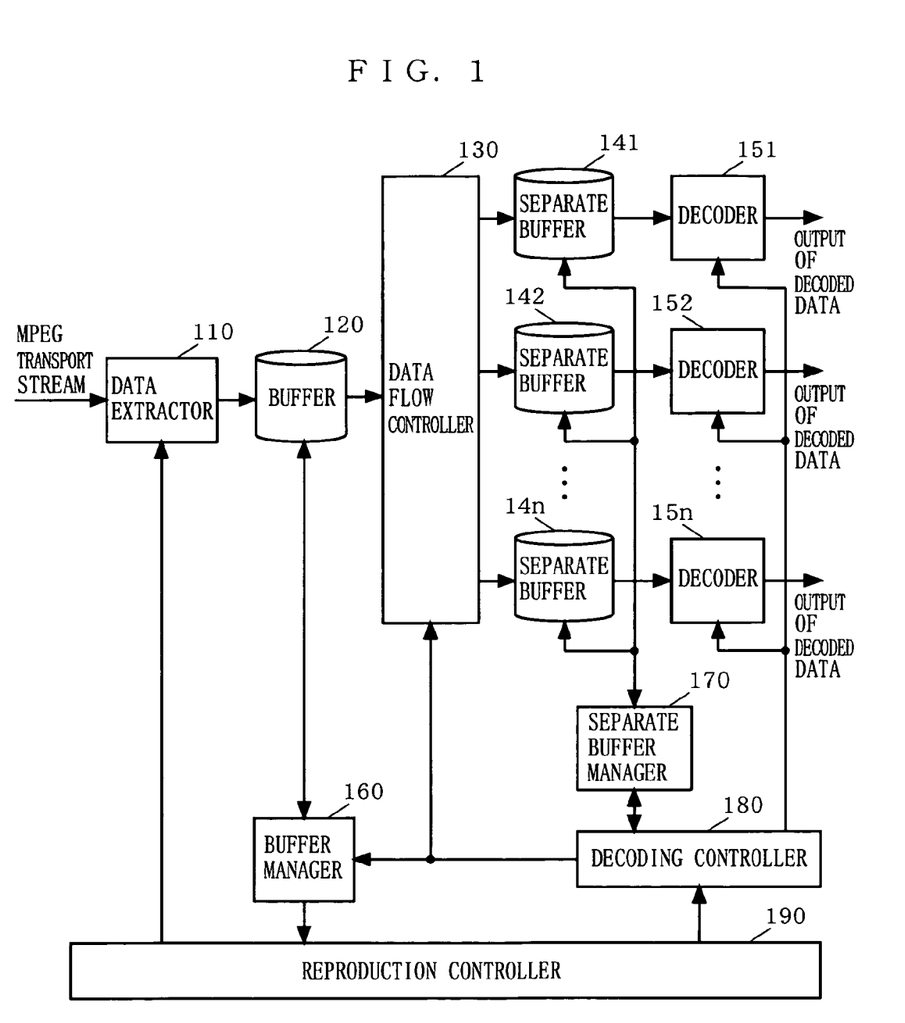
FIG. 1 is a block diagram showing the configuration of a multiple decoding apparatus according to an embodiment of the present invention.

FIG. 1 is a block diagram showing the configuration of a multiple decoding apparatus according to an embodiment of the present invention. FIGS. 2 to 6 are flow charts for explaining the procedure for processing in a multiple decoding method respectively carried out by the multiple decoding apparatus according to the present embodiment.

Description is now made of the outline of the configuration of the multiple decoding apparatus according to the present embodiment.

In FIG. 1, the multiple decoding apparatus according to the present embodiment comprises a data extractor 110, a buffer 120, a data flow controller 130, n (n is an arbitrary integer) separate buffers 141 to 14n, n decoders 151 to 15n, a buffer manager 160, a separate buffer manager 170, a decoding controller 180, and a reproduction controller 190.

The data extractor 110 outputs data which coincides with conditions set from inputted data. The buffer 120 temporarily stores the data extracted by the data extractor 110. The data flow controller 130 respectively transfers the data inputted from the buffer 120 to the separate buffers 141 to 14n in accordance with the set conditions. The separate buffers 141 to 14n are prepared for the decoders 151 to 15n, to store the data transferred from the data flow controller 130. The decoders 151 to 15n respectively decode the data stored in the separate buffers 141 to 14n. The buffer manager 160 manages the buffer 120. The separate buffer manager 170 respectively manages the separate buffers 141 to 14n. The decoding controller 180 respectively controls the decoding performed by the decoders 151 to 15n. The reproduction controller 190 provides an instruction to select, out of the data inputted to the data extractor 110, the data to be decoded and reproduce the selected data.

Referring now to FIGS. 2 to 6, description is made of the multiple decoding method respectively carried out by the multiple decoding apparatus according to the present embodiment.

Description is herein made, taking as an example a case where data respectively stored in three packets using "Header 1", "Header 2" and "Header 3" as their header portions are reproduced. That is, in FIG. 2, m=3.

Figure 2:
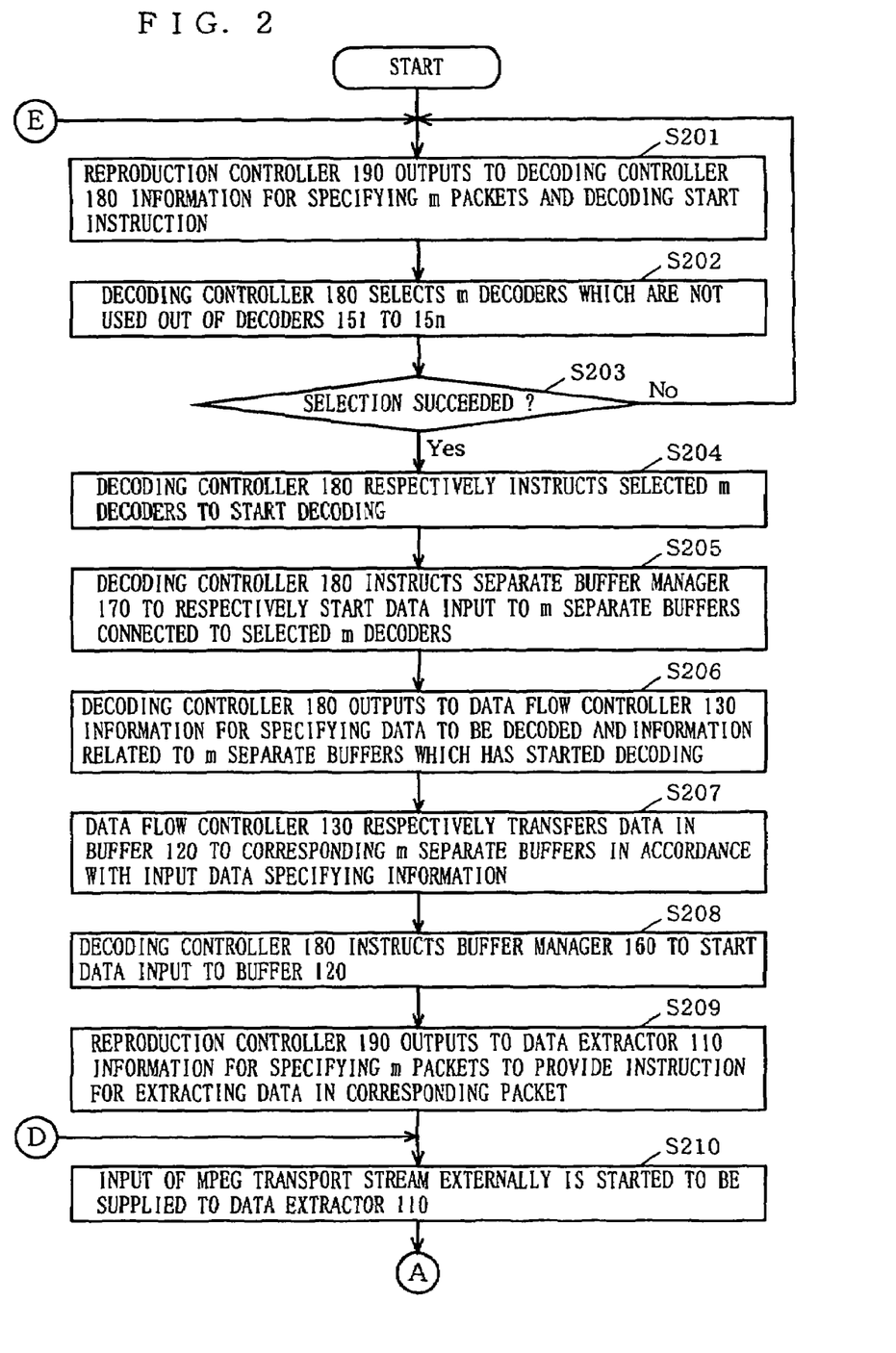
FIGS. 2 and 3 are flow charts showing the procedure for processing performed by the multiple decoding apparatus according to the embodiment of the present invention.

In this case, the reproduction controller 190 outputs a decoding start instruction to the decoding controller 180 in order to reproduce the data stored in the three packets (step S201). The decoding controller 180 which has received the instruction selects, out of the decoders 151 to 15n, the three arbitrary decoders, which are not used at that time. In this example, the decoders 151 to 153 shall be selected (steps S202 and S203). When a required number of decoders cannot be selected because they have already been used for another decoding, the decoding may be caused to wait until the all required number of decoders can be selected, or, if any decoder can be selected, the decoding in the selected decoders may be performed in advance.

The decoding controller 180 respectively instructs the selected three decoders 151 to 153 to start the decoding (step S204). Further, the decoding controller 180 outputs, in order to respectively issue data input start instructions to the separate buffers 141 to 143 connected to the selected decoders 151 to 153, an instruction to start data input to the separate buffer manager 170 (step S205).

The decoding controller 180 then sets in the data flow controller 130 conditions for transferring the data stored in the packet having "Header 1", the data stored in the packet having "Header 2", and the data stored in the packet having "Header 3", respectively, to the separate buffer 141, the separate buffer 142, and the separate buffer 143 (step S206). The data flow controller 130 starts the transfer of the data stored in the buffer 120 to each of the separate buffers 141 to 143 on the basis of the conditions set by the decoding controller 180 (step S207). The decoding controller 180 then instructs the buffer manager 160 to start data input to the buffer 120 (step S208). Thereafter, the reproduction controller 190 instructs the data extractor 110 to extract the packets respectively having "Header 1", "Header 2" and "Header 3" in their header portions (step S209). Consequently, the input of the MPEG transport stream externally supplied to the data extractor 110 is started (step S210).

Figure 3:
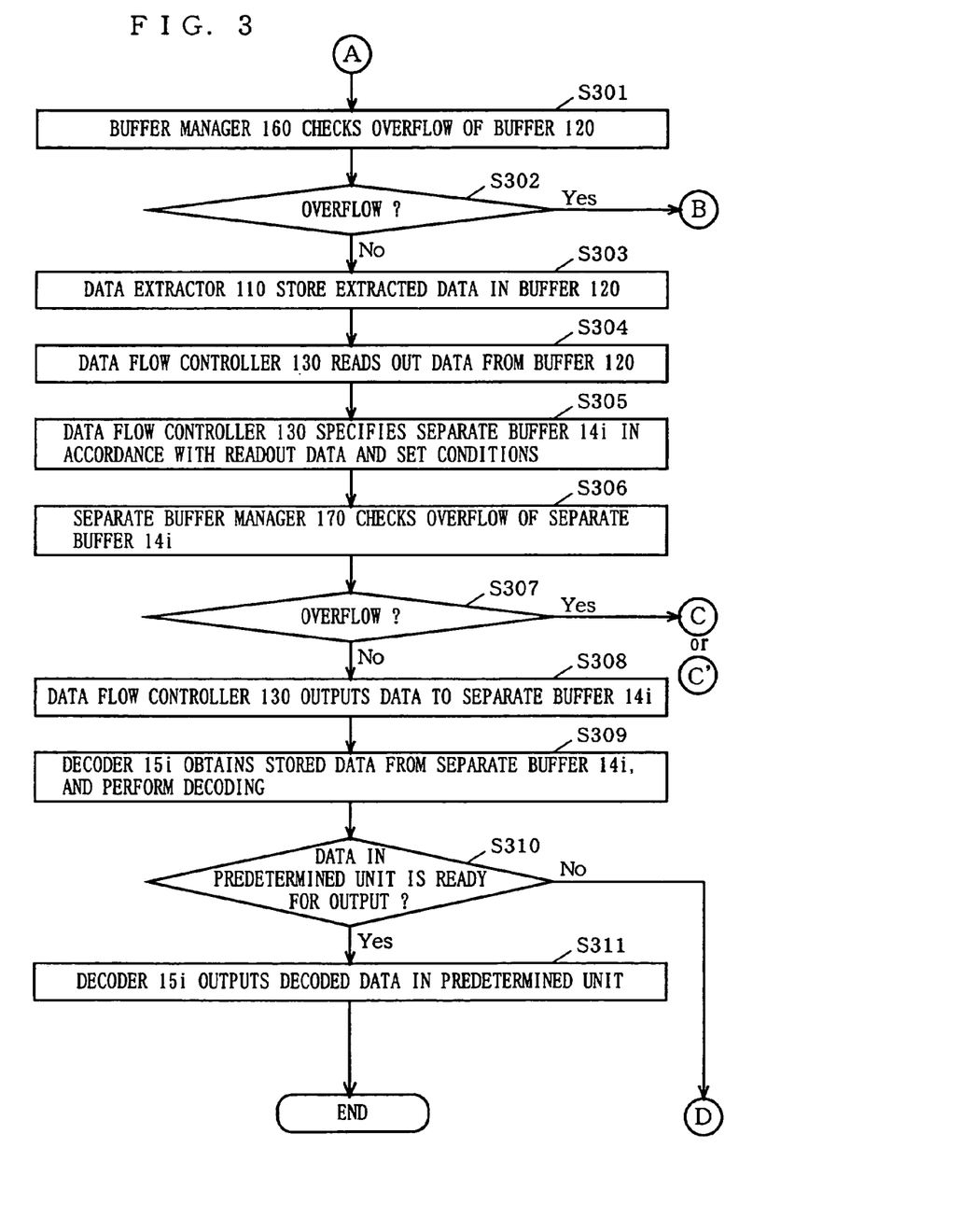

When the data extractor 110 sequentially extracts the packets designated from the MPEG transport stream in accordance with the instruction received from the reproduction controller 190, the buffer manager 160 checks, when the data stored in the payload portions of the packets are stored in the buffer 120, whether or not the buffer 120 overflows (step S301). The decoding performed in the following manner differs depending on the presence or absence of the overflow of the buffer 120.

When the buffer 120 does not overflow (No in step S302), the data extractor 110 stores the extracted data in the buffer 120 (step S303). Subsequently, the data flow controller 130 sequentially reads out the stored data from the buffer 120 (step S304), and respectively specifies the separate buffers 14i (i=1 to 3 in this example) at destinations of transfer in accordance with the set conditions (step S305). When the data read out is the data stored in the packet having "Header 1", for example, the separate buffer 141, which is the destination of transfer of the data, is specified.

Figure 4:
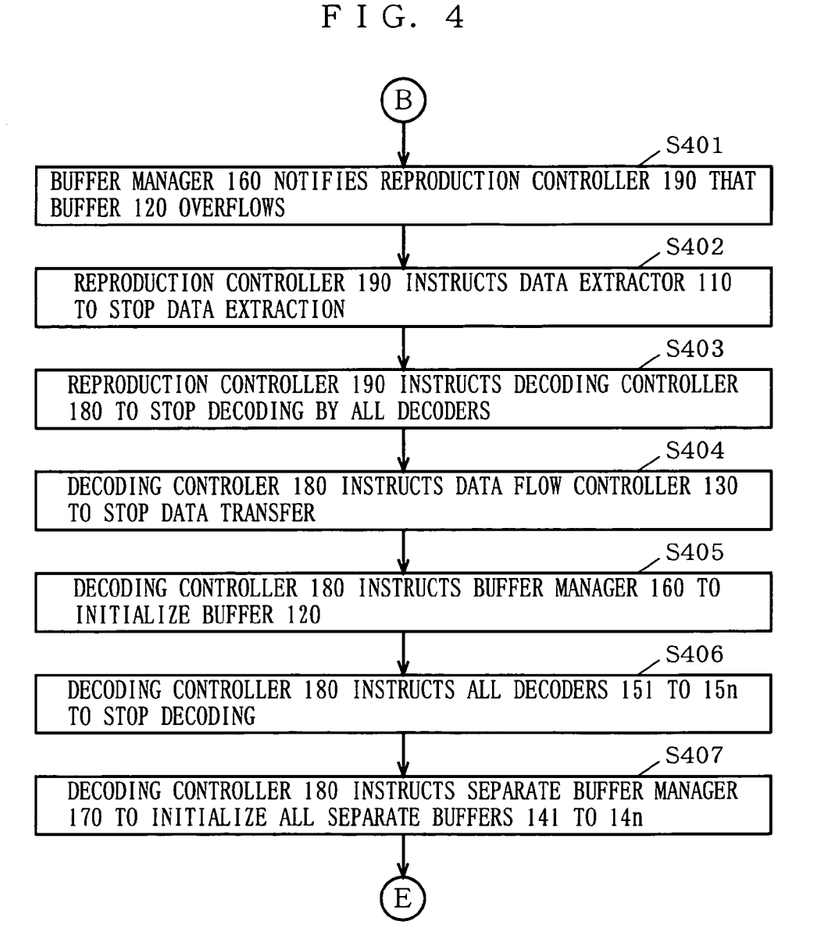
FIG. 4 is a flow chart showing the procedure for processing in a case where a buffer 120 overflows.

On the other hand, when the buffer 120 overflows (Yes at step S302), the buffer manager 160 notifies the reproduction controller 190 that the buffer 120 overflows (step S401). The reproduction controller 190 which has been notified instructs the data extractor 110 to stop the data extraction (step S402), and then instructs the decoding controller 180 to stop the decoding by all the decoders (step S403). The decoding controller 180 instructs the data flow controller 130 to stop the data transfer to all the separate buffers 141 to 14n (step S404), and instructs the buffer manager 160 to initialize the buffer 120 (step S405). The decoding controller 180 which has received the instruction issues an instruction to stop the decoding by all the decoders 151 to 15n (step S406), and then instructs the separate buffer manager 170 to initialize all the separate buffers 141 to 14n (step S407).

When the multiple decoding apparatus is entirely initialized by the processing, the processing from the step in which the decoding start instruction is outputted from the reproduction controller 190 (step S201) to the step in which the separate buffer 14i is specified (step S305) is performed again.

The separate buffer manager 170 then checks, when the data flow controller 130 stores in the specified separate buffer 14i the data read out of the buffer 120, whether or not the separate buffer 14i overflows (step S306). The decoding differs, as described below, depending on the presence or absence of the overflow of the separate buffer 14i.

First when the separate buffer 14i does not overflow (No in step S307), the data flow controller 130 stores the read data in the separate buffer 14i (step S308). The decoder 15i decodes the data, when the data is stored in the separate buffer 14i (step S309). The decoder 15i checks whether or not the decoded data, corresponding to a predetermined unit to be outputted, are ready for output (step S310). When the decoded data are not ready for output, the decoder 15i enters a stand-by state until the subsequent data arrives. When the decoded data are ready for output, the decoder 15i outputs the decoded data in the predetermined unit (step S311).

Although description is herein made of a case where the decoded data are not outputted until they correspond to the predetermined unit to be outputted, the decoded data may be outputted as they are.

On the other hand, when the separate buffer 14i overflows (Yes at step S307), two methods, described below, are considered as processes which can be carried out by the multiple decoding apparatus:

(Process 1)

Figure 5:
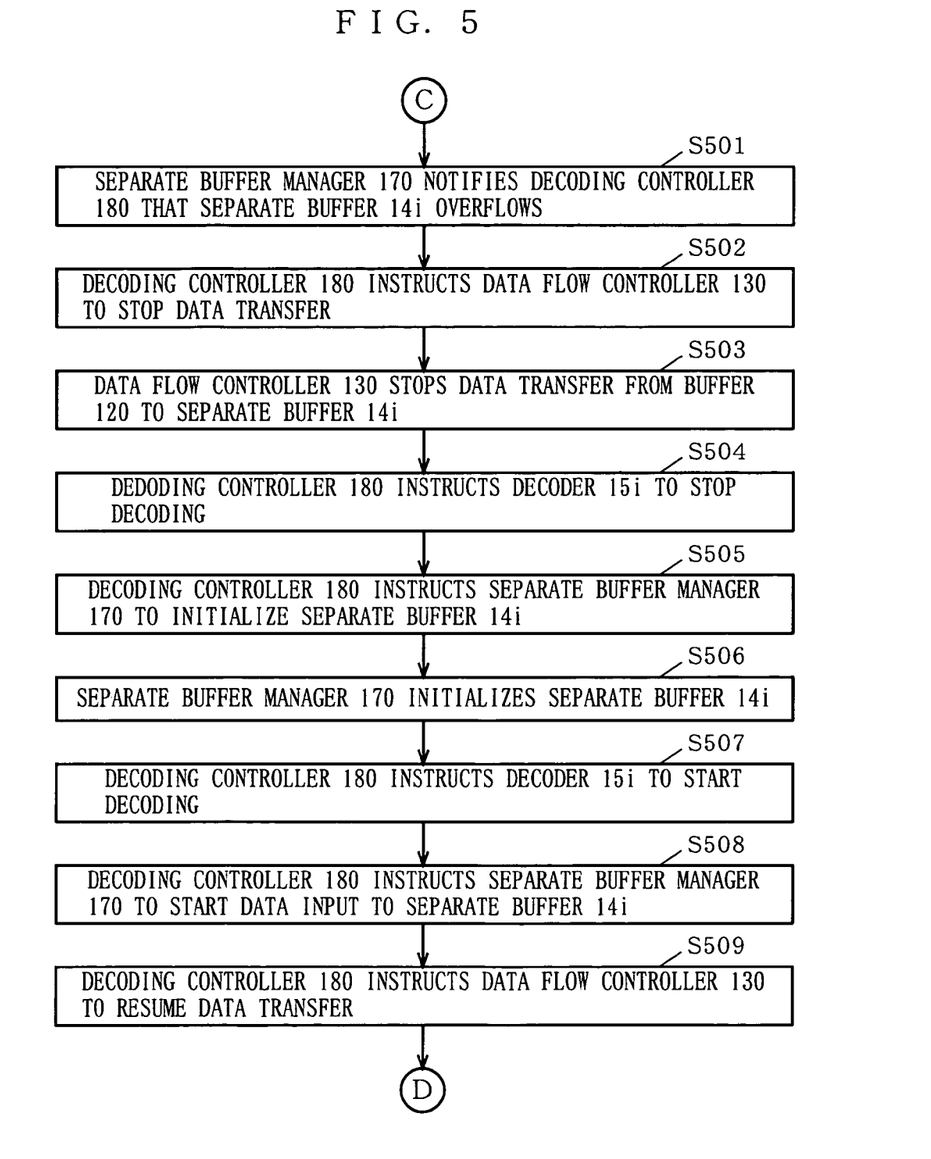
FIGS. 5 and 6 are flow charts showing the procedure for processing in a case where a separate buffer 14i overflows.

The separate buffer manager 170 notifies the decoding controller 180 that the separate buffer 14i overflows (step S501). The decoding controller 180 which has been notified instructs the data flow controller 130 to stop the data transfer from the buffer 120 to the separate buffer 14i (step S502). The data flow controller 130 which has received the instruction stops the data transfer from the buffer 120 to the separate buffer 14i (step S503). During the stop, the data outputted from the data extractor 110 are stored in the buffer 120.

The data continues to be stored in the buffer 120 in a time period elapsed from the time when the data transfer by the data flow controller 130 is stopped until the data transfer is resumed. Accordingly, the size S1(bit) of the buffer 120 must be determined so as to satisfy the following relational expression:

$$S1 > S2 + RATE * T$$

Here, assume that RATE(bit/sec) is the transfer rate of the data received from the data extractor 110 by the buffer 120, S2(bit) is the size of the data stored in the buffer 120 the moment the data flow controller 130 transfers the data, and T(sec) is a time period elapsed from the time when the data transfer by the data flow controller 130 is stopped until the data transfer is resumed.

The decoding controller 180 then instructs the decoder 15i to stop the decoding (step S504), and further instructs the separate buffer manager 170 to initialize the separate buffer 14i (step S505). The separate buffer manager 170 which has received the instruction initializes the separate buffer 14i (step S506). After the initialization, the decoding controller 180 instructs the decoder 15i to start the decoding again (step S507), and instructs the separate buffer manager 170 to start data input to the separate buffer 14i (step S508). The decoding controller 180 instructs the data flow controller 130 to resume the data transfer (step S509), so that the data transfer from the buffer 120 to the separate buffer 14i is resumed.

Thereafter, the processing in the step S210 and the subsequent steps is repeatedly performed.

(Process 2)

Figure 6:
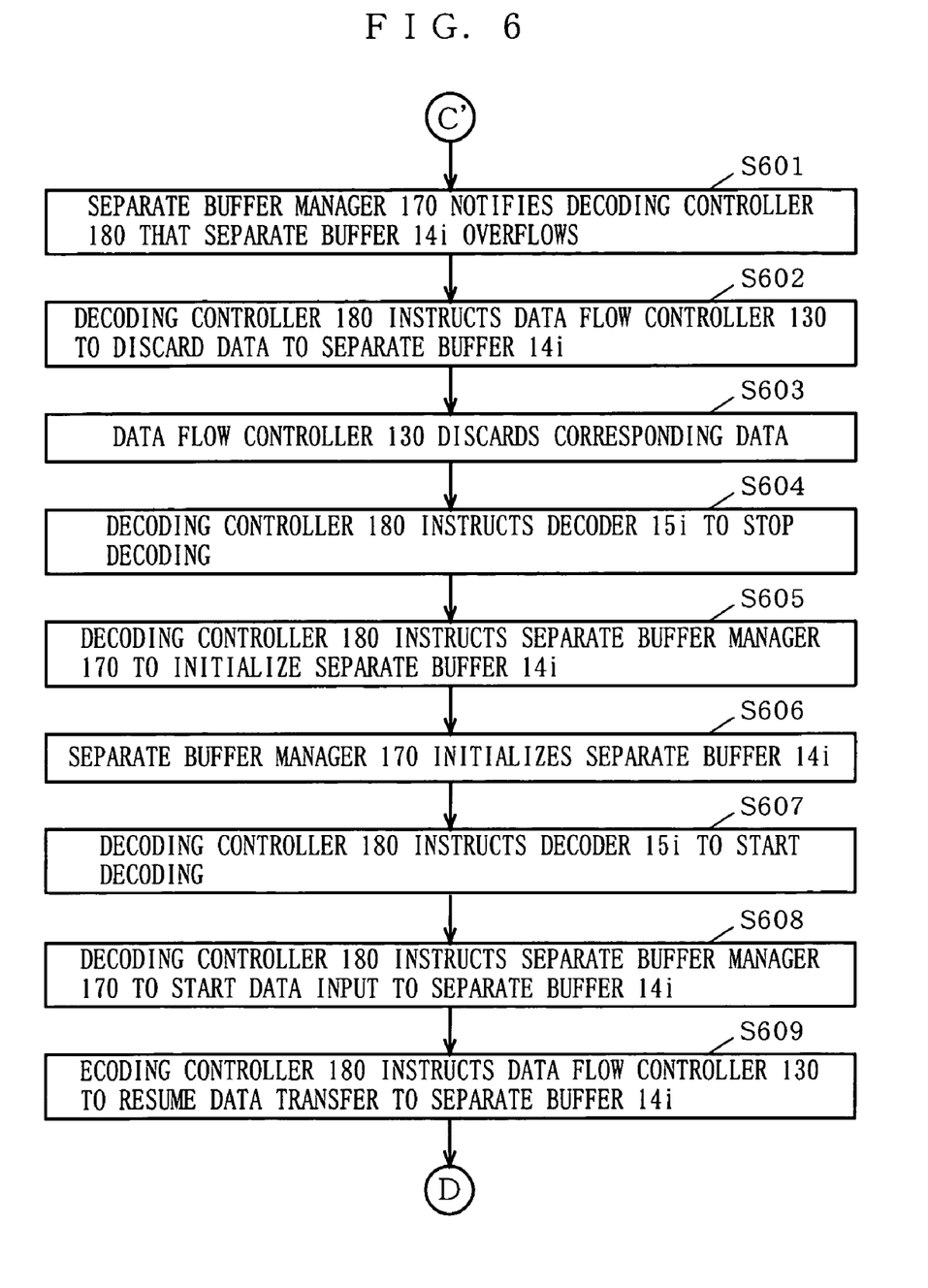

The separate buffer manager 170 notifies the decoding controller 180 that the separate buffer 14i overflows (step S601). The decoding controller 180 which has been notified instructs the data flow controller 130 to discard the data read out of the buffer 120 to the separate buffer 14i (step S602). The data flow controller 130 which has received the instruction discards the corresponding data (step S603).

The decoding controller 180 then instructs the decoder 15i to stop the decoding (step S604), and instructs the separate buffer manager 170 to initialize the separate buffer manager 14i (step S605). The separate buffer manager 170 which has received the instruction initializes the separate buffer 14i (step S606). After the initialization, the decoding controller 180 instructs the decoder 15i to resume the decoding (step S607), and instructs the separate buffer manager 170 to resume the data input to the separate buffer 14i from the buffer 120 (step S608). The decoding controller 180 then outputs to the data flow controller 130 an instruction to resume the data transfer of the corresponding data to the separate buffer 14i (step S609).

Thereafter, the processing in the step S210 and the subsequent steps is repeatedly performed.

Although in the description of the (Process 2), the subsequent data input processing is performed upon recovering the separate buffer 14i which overflows after the data is discarded in the data flow controller 130, the subsequent data input processing may be performed asynchronously with overflow recovery processing after the data is discarded.

As described in the foregoing, in the multiple decoding apparatus and method according to one embodiment of the present invention, a plurality of encoded data can be simultaneously decoded. Further, even when the buffer 120 or the separate buffers 141 to 14n overflow due to the occurrence of any error, it is feasible to recover unsuccessful decoding due to the error.

Although description was made, taking as an example a case where the signal to be inputted is the MPEG transport stream, the signal to be inputted is not limited to the same. The signal to be inputted may be another signal, provided that it has identification information for identifying a plurality of data and has such a format that the plurality of data are mixed (frequency-division multiplexed, time-division multiplexed, for example).

While the invention has been described in detail, the foregoing description is in all aspects illustrative and not restrictive. It is understood that numerous other modifications and variations can be devised without departing from the scope of the invention.

What is claimed is:

1. A multiple decoding apparatus for receiving a broadcasting signal composed of a plurality of encoded data and for simultaneously decoding two or more of the encoded data, the multiple decoding apparatus comprising:

a reproduction controller for outputting control information related to decoding and reproduction of data;

a data extractor for receiving the broadcasting signal and extracting at least audio data and video data which are designated by the control information;

a buffer for storing at least the audio data and the video data extracted by said data extractor;

a buffer manager for controlling said buffer in accordance with the control information for said buffer;

a data flow controller for distributing at least the audio data and the video data stored in said buffer for each data type and transferring at least the audio data and the video data in accordance with provided transfer conditions;

a plurality of separate buffers for respectively storing at least the audio data and the video data distributed and transferred by said data flow controller according to each data type;

a separate buffer manager for controlling output of at least the audio data and the video data respectively stored in said plurality of separate buffers so as to be associated with each other in accordance with information for specifying said plurality of separate buffers;

a plurality of decoders respectively corresponding to said plurality of separate buffers for decoding at least the audio data and the video data stored in said plurality of separate buffers and outputting two or more decoded data; and a decoding controller for selecting a separate buffer and a decoder, which are used for the decoding, according to a usage status of said decoder from among said plurality of separate buffers and said plurality of decoders in accordance with the control information, and outputting information related to said separate buffer selected by said decoding controller, the transfer conditions based on said separate buffer selected by said decoding controller, and an instruction to start decoding, respectively, to said separate buffer manager, said data flow controller, and said decoder selected by said decoding controller, wherein said separate buffer manager outputs, when a specific separate buffer becomes full of data, an overflow notification that said specific separate buffer overflows to said decoding controller, said decoding controller outputs, upon receipt of the overflow notification that said specific separate buffer overflows, an instruction to stop data transfer to said specific separate buffer to said data flow controller, outputs an instruction to stop decoding to a decoder corresponding to said specific separate buffer, and outputs an instruction to initialize said specific separate buffer to said separate buffer manager, said separate buffer manager initializes said specific separate buffer in accordance with the instruction to initialize said specific separate buffer from said decoding controller without initializing said buffer, and the multiple decoding apparatus resumes all processing which was stopped as a result of said specific separate buffer becoming full after said specific separate buffer is initialized.

2. A multiple decoding apparatus for receiving a broadcasting signal composed of a plurality of encoded data and for simultaneously decoding two or more of the encoded data, the multiple decoding apparatus comprising:

a reproduction controller for outputting control information related to decoding and reproduction of data;

a data extractor for receiving the broadcasting signal and extracting at least audio data and video data which are designated by the control information;

a buffer for storing at least the audio data and the video data extracted by said data extractor;

a buffer manager for controlling said buffer in accordance with the control information for said buffer;

a data flow controller for distributing at least the audio data and the video data stored in said buffer for each data type and transferring at least the audio data and the video data in accordance with provided transfer conditions;

a plurality of separate buffers for respectively storing at least the audio data and the video data distributed and transferred by said data flow controller according to each data type;

a separate buffer manager for controlling output of at least the audio data and the video data respectively stored in said plurality of separate buffers so as to be associated with each other in accordance with information for specifying said plurality of separate buffers;

a plurality of decoders respectively corresponding to said plurality of separate buffers for decoding at least the audio data and the video data stored in said plurality of separate buffers and outputting two or more decoded data; and a decoding controller for selecting a separate buffer and a decoder, which are used for the decoding, according to a usage status of said decoder from among said plurality of separate buffers and said plurality of decoders in accordance with the control information, and outputting information related to said separate buffer selected by said decoding controller, the transfer conditions based on said separate buffer selected by said decoding controller, and an instruction to start decoding, respectively, to said separate buffer manager, said data flow controller, and said decoder selected by said decoding controller, wherein said separate buffer manager outputs, when a specific separate buffer becomes full of data, an overflow notification that said specific separate buffer overflows to said decoding controller, said decoding controller outputs, upon receipt of the overflow notification that said specific separate buffer overflows, an instruction to discard encoded data directed toward said specific separate buffer to said data flow controller, outputs an instruction to stop decoding to a decoder corresponding to said specific separate buffer, and outputs an instruction to initialize said specific separate buffer to said separate buffer manager, said separate buffer manager initializes said specific separate buffer in accordance with the instruction to initialize said specific separate buffer from said decoding controller without initializing said buffer, and the multiple decoding apparatus resumes all processing which was stopped as a result of said specific separate buffer becoming full, and the discard of the encoded data is released after said specific separate buffer is initialized.

3. A multiple decoding method for simultaneously decoding two or more encoded data from a broadcasting signal composed of a plurality of encoded data, the multiple decoding method comprising:

selecting a plurality of decoders for performing decoding and a plurality of separate buffers corresponding to the plurality of decoders, respectively, according to usage status of the plurality of decoders;

extracting at least audio data and video data to be decoded and reproduced from the broadcasting signal;

storing at least the extracted audio data and video data in a buffer;

distributing at least the audio data and the video data stored in the buffer for each data type and respectively storing at least the audio data and the video data in the plurality of separate buffers according to each data type;

controlling output of at least the audio data and the video data stored in the separate buffers such that at least the audio data and the video data stored in the separate buffers are associated with each other; and decoding, responsive to said controlling, at least the audio data and the video data stored in the separate buffers and outputting two or more decoded data, wherein, when a specific separate buffer becomes full of data:

stopping said distributing of at least the audio data and the video data into the specific separate buffer and said decoding of encoded data stored in the specific separate buffer;

initializing the specific separate buffer without initializing the buffer; and resuming all processing which was stopped when the specific separate buffer became full after said initializing of the specific separate buffer.

4. A multiple decoding method for simultaneously decoding two or more encoded data from a broadcasting signal composed of a plurality of encoded data, the multiple decoding method comprising:

selecting a plurality of decoders for performing decoding and a plurality of separate buffers corresponding to the plurality of decoders, respectively, according to usage status of the plurality of decoders;

extracting at least audio data and video data to be decoded and reproduced from the broadcasting signal;

storing at least the extracted audio data and video data in a buffer;

distributing at least the audio data and the video data stored in the buffer for each data type and respectively storing at least the audio data and the video data in the plurality of separate buffers according to each data type;

controlling output of at least the audio data and the video data stored in the separate buffers such that at least the audio data and the video data stored in the separate buffers are associated with each other; and decoding, responsive to said controlling, at least the audio data and the video data stored in the separate buffers and outputting two or more decoded data, wherein, when a specific separate buffer becomes full of data:

discarding encoded data directed toward the specific separate buffer;

stopping said decoding of at least the audio data and the video data stored in the specific separate buffer;

initializing the specific separate buffer without initializing the buffer; and resuming all processing which was stopped when the specific separate buffer became full after said initializing of the specific separate buffer, and releasing the discard of the encoded data.

* * * * *